United States Patent
Wang et al.

(10) Patent No.: US 11,163,340 B2
(45) Date of Patent: Nov. 2, 2021

(54) ELECTRONIC DEVICES WITH FIBER COMPOSITE FRICTION HINGES

(71) Applicant: Apple Inc., Cupertino, CA (US)

(72) Inventors: Paul X. Wang, Cupertino, CA (US); Simon R. Lancaster-Larocque, San Jose, CA (US); Bradley J. Hamel, San Carlos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 16/900,766

(22) Filed: Jun. 12, 2020

(65) Prior Publication Data

US 2021/0011524 A1 Jan. 14, 2021

Related U.S. Application Data

(60) Provisional application No. 62/871,922, filed on Jul. 9, 2019.

(51) Int. Cl.
*G06F 1/16* (2006.01)
*G09F 9/33* (2006.01)
*G09F 9/30* (2006.01)

(52) U.S. Cl.
CPC .......... *G06F 1/1681* (2013.01); *G06F 1/1652* (2013.01); *G09F 9/301* (2013.01); *G09F 9/33* (2013.01)

(58) Field of Classification Search
CPC combination set(s) only.
See application file for complete search history.

(56) References Cited

U.S. PATENT DOCUMENTS

| | | |
|---|---|---|
| 6,385,815 B1 | 5/2002 | Hayashida et al. |
| 7,582,345 B2 | 9/2009 | Priegelmeir et al. |
| 7,907,394 B2 | 3/2011 | Richardson et al. |
| 8,638,549 B2 | 1/2014 | Garelli et al. |
| 9,797,439 B2 | 10/2017 | Masini et al. |
| 10,013,022 B1 | 7/2018 | Aurongzeb et al. |
| 10,890,951 B1 * | 1/2021 | Watamura ............. G06F 1/1616 |
| 11,016,530 B2 * | 5/2021 | Watamura ............. G06F 1/1641 |
| 11,054,869 B2 * | 7/2021 | Moon .................... G06F 1/1616 |

(Continued)

FOREIGN PATENT DOCUMENTS

| | | |
|---|---|---|
| JP | 2002250335 A | 9/2002 |
| WO | 2019005586 A1 | 1/2019 |

*Primary Examiner* — Lisa Lea-Edmonds
(74) *Attorney, Agent, or Firm* — Treyz Law Group, P.C.; G. Victor Treyz

(57) ABSTRACT

An electronic device may have a fiber composite friction hinge with first and second members that rotate relative to each other about a hinge axis. The fiber composite hinge may have first and second sets of interdigitated elongated fingers. Holes in the elongated fingers may receive a shaft of a fastener. The fastener may be tightened to squeeze the elongated fingers together along the hinge axis. The fiber composite hinge may be formed from a fiber composite material such as carbon fiber composite material. Fibers in the composite material may be embedded in binder such as polymer binder. The fibers may wrap around the holes and fold back on themselves in the fingers. Actuators may be provided to adjust the positions of portions of the hinge members. The electronic device may have a flexible layer such as a flexible display that overlaps the hinge structure.

28 Claims, 12 Drawing Sheets

(56) References Cited

U.S. PATENT DOCUMENTS

| | | |
|---|---|---|
| 2003/0163900 A1 | 9/2003 | Rude et al. |
| 2013/0122770 A1 | 5/2013 | Wahal et al. |
| 2015/0286255 A1* | 10/2015 | Hamel .................. G06F 1/1681 312/327 |
| 2016/0161994 A1* | 6/2016 | Lee ........................ G06F 1/1681 16/385 |
| 2016/0178062 A1* | 6/2016 | Hofmann ................ F01D 11/00 277/355 |
| 2017/0334151 A1* | 11/2017 | Abbatiello ............ B29C 43/146 |

\* cited by examiner

ELECTRONIC DEVICES WITH FIBER COMPOSITE FRICTION HINGES

This application claims the benefit of provisional patent application No. 62/871,922, filed Jul. 9, 2019, which is hereby incorporated by reference herein in its entirety.

FIELD

This relates generally to electronic devices, and, more particularly, to electronic devices with hinges.

BACKGROUND

Electronic devices may have portions that are joined with hinges. For example, a laptop computer may have a display housing that is coupled to a keyboard housing with a hinge. The hinge allows the laptop to be opened and closed and allows a user to adjust the angle at which the display housing is oriented.

If care is not taken, hinge structures may be bulky, weak, and prone to slippage. This can make it difficult to use a laptop computer or other electronic device into which the hinge structures have been incorporated.

SUMMARY

An electronic device may have a fiber composite friction hinge with first and second hinge members that rotate relative to each other about a hinge axis. The fiber composite friction hinge may be formed from carbon fiber material or other fiber composite material.

The fiber composite hinge may have first and second sets of interdigitated elongated fingers extending respectively from the first and second hinge members. Holes in the elongated fingers may receive a shaft of a fastener aligned with the hinge axis. The fastener may be tightened to press the elongated fingers together along the hinge axis, thereby generating friction to help hold the hinge in a desired configuration.

Fibers in the composite material may be embedded in binder such as polymer binder. The fibers may wrap around the holes and fold back on themselves in the fingers. The ends of the fingers may be wrapped in additional fibers. The fingers may be integral with other portions of the hinge members or may be embedded in separate support structures. Actuators may be provided to adjust the positions of portions of the hinge members. The electronic device may have a flexible layer such as a flexible display that overlaps the hinge structure. First and second housing portions that rotate with respect to each other may be coupled, respectively, to the first and second hinge members. The housing portions may be integral with the hinge members or may have separate core structures covered with claddings that are attached to the hinge members.

DETAILED DESCRIPTION

An electronic device may have a one or more hinges. For example, a folding device may have a first housing portion that is coupled to a second housing portion by a friction hinge. The friction hinge may include fiber-reinforced structures such as carbon fiber composite structures and other fiber composite structures. The use of fiber composite structures may help reduce hinge bulk while improving hinge performance.

Figure 1:
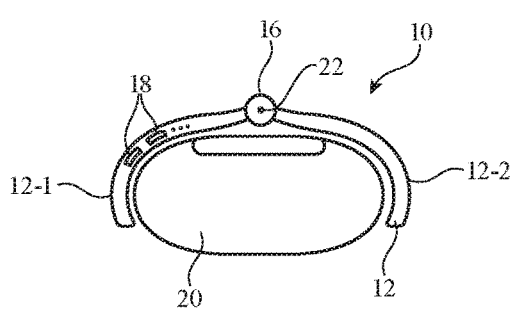
FIG. 1 is a side view of an illustrative electronic device such as a finger-mounted device with a hinge in accordance with an embodiment.

A cross-sectional end view of an illustrative electronic device with a hinge is shown in FIG. 1. In the example of FIG. 1, device 10 is a finger device that has been mounted to the upper portion of a user's finger (finger 20).

Device 10 includes a housing such as housing 12. Housing 12 may be formed from polymer, metal, glass, crystalline material such as sapphire, ceramic, fabric, fibers, fiber composite material in which carbon fiber strands, fiberglass strands, or other strands of material are embedded in a binder, natural materials such as wood and cotton, other materials, and/or combinations of such materials. Fiber composite material, which may sometimes be referred to as fiber-reinforced composite material or fiber-based material, may include strands of material such as carbon fibers, fiberglass, polymer fibers, or other fibers. These strands of material may be impregnated with polymer binder material (e.g., epoxy or other binders). When cured, the polymer binder in which the fibers are embedded helps hold the fibers together to form a fiber composite structure (e.g., a portion of housing 12 and/or other structures in device 10).

As shown in FIG. 1, housing 12 may have multiple portions such as first portion 12-1 and second portion 12-2. Hinge structures such as hinge 16 may be used to join housing portion 12-2 to housing portion 12-2 while permitting portions 12-1 and 12-2 to rotate relative to each other. Hinge 16 of FIG. 1 may be characterized by a hinge axis that runs into the page (e.g., hinge axis 22).

Housing 12 (and, if desired, housing structures formed from hinge 16) may be configured to form housing walls. The housing walls may enclose one or more interior regions. Electrical components 18 may be mounted in the interior regions defined by the housing walls. Electrical components 18 may include integrated circuits, printed circuit signal paths, discrete components, cables, batteries, and/or other circuitry. If desired, one or more portions of the housing walls may be transparent (e.g., so that light associated with an image on a display or other light-emitting or light-detecting component can pass between the exterior and interior of housing 12).

Electrical components 18 may include control circuitry. The control circuitry may include storage and processing circuitry for supporting the operation of device 10. The storage and processing circuitry may include storage such as hard disk drive storage, nonvolatile memory (e.g., flash memory or other electrically-programmable-read-only memory configured to form a solid state drive), volatile memory (e.g., static or dynamic random-access-memory), etc. Processing circuitry in the control circuitry may be used to control the operation of device 10. For example, the processing circuitry may use sensors and other input-output circuitry to gather input and to provide output and/or to transmit signals to external equipment. The processing circuitry may be based on one or more microprocessors, microcontrollers, digital signal processors, baseband processors, power management units, audio chips, application specific integrated circuits, etc. The control circuitry may include wired and/or wireless communications circuitry (e.g., antennas and associated radio-frequency transceiver circuitry such as cellular telephone communications circuitry, wireless local area network communications circuitry, etc.). The communications circuitry of the control circuitry may allow device 10 to communicate with other electronic devices. For example, the control circuitry (e.g., communications circuitry in the control circuitry) may be used to allow wired and/or wireless control commands and other communications to be conveyed between devices such as cellular telephones, tablet computers, laptop computers, desktop computers, head-mounted devices, handheld controllers, finger devices, wristwatch devices, other wearable devices, keyboards, computer mice, remote controls, speakers, accessory displays, accessory cameras, and/or other electronic devices. Wireless communications circuitry may, for example, wirelessly transmit control signals and other information to external equipment in response to receiving user input or other input from sensors or other devices in components 18.

Input-output circuitry in components 18 of device 10 may be used to allow data to be supplied to device 10 and to allow data to be provided from device 10 to external devices. The input-output circuitry may include input devices that gather user input and other input and may include output devices that supply visual output, audible output, or other output. Components 18 may include one or more optional displays. The displays may, for example, include an organic light-emitting diode display, a liquid crystal display, a projector display (e.g., a projector based on a micromechanical systems device such as a digital micromirror device or other projector components), a scanning mirror device, a display having an array of pixels formed from respective light-emitting diodes (e.g., a pixel array having pixels with crystalline light-emitting diodes formed from respective light-emitting diode dies such as micro-light-emitting diode dies), and/or other displays. The displays may include rigid display structures and/or may be flexible displays. For example, a light-emitting diode display may be sufficiently flexible to be bent. Displays for device 10 may be mounted on exterior housing surfaces and/or may be covered with transparent housing structures that offer protection. A display for device 10 may be a touch screen display that includes a touch sensor for gathering touch input from a user or may be a touch insensitive display that is not sensitive to touch.

In addition to displays, output may be provided using other output devices in components 18. These devices may include, for example, light-emitting diodes (e.g., crystalline semiconductor light-emitting diodes for status indicators and/or displays, organic light-emitting diodes in displays and other components), lasers, and other light-emitting devices, audio output devices (e.g., tone generators and/or speakers), haptic output devices (e.g., vibrators, electromagnetic actuators, piezoelectric actuators, and/or other equipment that supplies a user with haptic output), and other output devices.

The input-output circuitry of device 10 (e.g., the input-output circuitry of components 18) may also include sensors. Sensors for device 10 may include force sensors (e.g., strain gauges, capacitive force sensors, resistive force sensors, etc.), audio sensors such as microphones, touch and/or proximity sensors such as capacitive sensors (e.g., a two-dimensional capacitive touch sensor integrated into a display, a two-dimensional capacitive touch sensor and/or a two-dimensional force sensor overlapping a display, and/or a touch sensor or force sensor that forms a button, trackpad, or other input device not associated with a display), and other sensors. Touch sensors for a display or for other touch components may be based on an array of capacitive touch sensor electrodes, acoustic touch sensor structures, resistive touch components, force-based touch sensor structures, a light-based touch sensor, or other suitable touch sensor arrangements. If desired, a display may have a force sensor for gathering force input (e.g., a two-dimensional force sensor may be used in gathering force input on a display).

If desired, the sensors may include optical sensors such as optical sensors that emit and detect light, ultrasonic sensors, optical touch sensors, optical proximity sensors, and/or other touch sensors and/or proximity sensors, monochromatic and color ambient light sensors, image sensors, fingerprint sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors, radio-frequency sensors (e.g., sensors that gather position information, three-dimensional radio-frequency images, and/or other information using radar principals or other radio-frequency sensing), depth sensors (e.g., structured light sensors and/or depth sensors based on stereo imaging devices), optical sensors such as self-mixing sensors and light detection and ranging (lidar) sensors that gather time-of-flight measurements, humidity sensors, moisture sensors, gaze tracking sensors, three-dimensional sensors (e.g., time-of-flight image sensors, pairs of two-dimensional image sensors that gather three-dimensional images using binocular vision, three-dimensional structured light sensors that emit an array of infrared light beams or other structured light using arrays of lasers or other light emitters and associated optical components and that capture images of the spots created as the beams illuminate target objects, and/or other three-dimensional image sensors), facial recognition sensors based on three-dimensional image sensors, and/or other sensors.

In some configurations, components 18 may include mechanical devices for gathering input (e.g., buttons, joysticks, scrolling wheels, key pads, keyboards, and other devices for gathering user input). During operation, device 10 may use sensors and/or other input-output devices in components 18 to gather user input (e.g., buttons may be used to gather button press input, touch and/or force sensors overlapping displays can be used for gathering user touch screen input and/or force input, touch pads and/or force sensor may be used in gathering touch and/or force input, microphones may be used for gathering audio input, etc.). The control circuitry of device 10 can then take action based on this gathered information (e.g., by transmitting the information over a wired or wireless path to external equipment, by supplying a user with output using a haptic output device, visual output device, or other input-output device in housing 12, etc.).

If desired, electronic device 10 may include additional components. These components may include, for example, a battery or other energy storage device, connector ports for supporting wired communications with ancillary equipment and for receiving wired power, and other circuitry. Device 10 may serve as an accessory and/or may include a wired and/or wireless accessory (e.g., a keyboard, computer mouse, remote control, trackpad, etc.).

Figure 2:
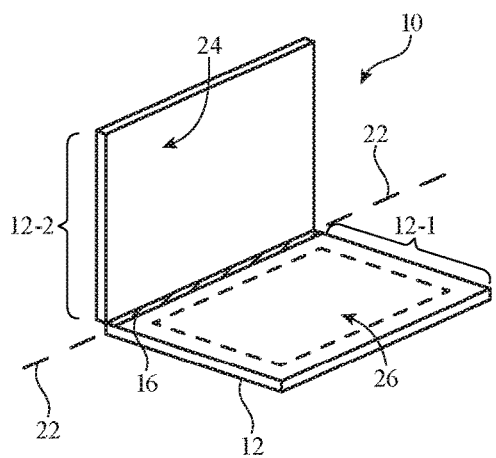
FIG. 2 is a perspective view of an illustrative electronic device such as a laptop computer or other foldable device in accordance with an embodiment.

In the example of FIG. 1, device 10 is a wearable device such as a finger device configured to be worn on a body part of a user such as finger 20. If desired, device 10 may be a portable electronic device such as a foldable cellular telephone or foldable tablet computer, a laptop computer, or other foldable portable electronic device. An illustrative foldable device is shown in FIG. 2. In the example of FIG. 2, device 10 has first housing portion 12-1 and second housing portion 12-2 that are coupled by hinge (hinge structure) 16. Hinge 16 allows portions 12-1 and 12-2 to rotate relative to each other about hinge axis 22.

Displays, keyboards, and other input-output devices (e.g., components 18) may be mounted in housing 12 of FIG. 2. For example, a keyboard, trackpad, and other input-output circuitry may be mounted on surface 26 of housing portion 12-1 in FIG. 2 and a display and/or other input-output components may be mounted on surface 24 of housing portion 12-2. In some configurations, a flexible display or other display structures may overlap axis 22 (e.g., an organic light-emitting diode display or other flexible display may span hinge 16 and may cover some or all of areas 24 and 26.

Figure 3:
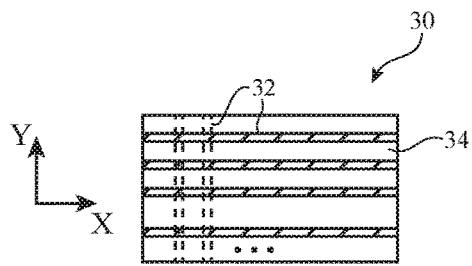
FIG. 3 is a diagram of illustrative fiber composite material in accordance with an embodiment.

Illustrative fiber composite material is shown in FIG. 3. As shown in FIG. 3, fiber composite material 30 has strands of material such as fibers 32. Fibers 32 may be formed from polymer, glass, metal, cotton or other natural materials, other materials or combinations of these materials. In an illustrative configuration, which may sometimes be described herein as an example, fibers 32 are carbon fibers (e.g., carbonized polymer fibers). Fibers 32 may be monofilaments (single-stranded) or yarn (multi-stranded). Fibers 32 may run exclusively or predominantly along a single axis (e.g., fibers 32 may be tow that extends along the X axis of FIG. 3) or fibers 32 may run in multiple directions (e.g., orthogonal directions). For example, fibers 32 may be woven to form woven carbon-fiber fabric.

Composite material 30 has binder 34 (sometimes referred to as matrix material). Binder 34 is used to hold fibers 32 in place. An illustrative material to use for binder 34 is polymer resin. The polymer resin used for binder 34 may a thermoset resin or a thermoplastic resin. Liquid resin (e.g., thermoset resin) can be cured into a desired shape using heat, using catalyst material, by exposure to light, etc. Thermoplastic resin materials be molded and remolded in heated dies.

It may be desirable for hinges in device 10 to hold their position. This allows a user to make adjustments to device 10 that are retained by device 10. As an example, a user may desire to adjust the angle at which a laptop housing lid is oriented relative to the laptop housing base. A friction hinge arrangement may be used by hinge 16 so that the lid stays in place after the user has adjusted the angle of the lid as desired. As another example, a friction hinge may be used for hinge 16 of FIG. 1 so that a user can adjust the pressure with which side portions of housing 12 grip against the left and right sides of finger 20. In this way, a user can adjust device 10 of FIG. 1 so that housing 12 grips tightly or loosely on finger 20.

In a friction hinge, hinge structures grip against each other with sufficient pressure to hold the hinge structures in place when released. At the same time, the hinge structures do not grip too tightly, so that it is possible for a user to overcome the hinge friction when it is desired to make adjustments.

Figure 4:
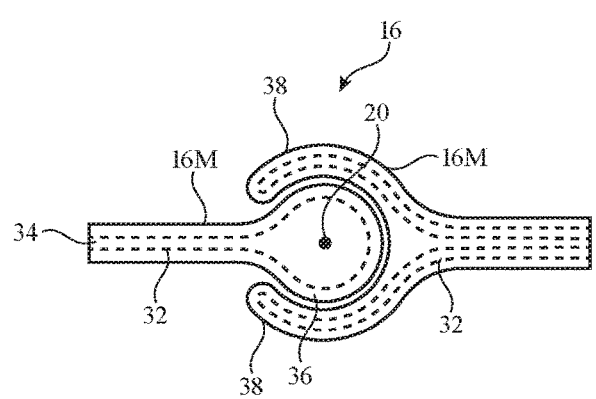
FIG. 4 is a cross-sectional side view of an illustrative hinge in accordance with an embodiment.

An illustrative friction hinge arrangement for hinge 16 is shown in FIG. 4. In the example of FIG. 4, hinge 16 has first and second hinge members 16M. The first hinge member has portion 36, which has a circular cross-sectional profile when viewed along hinge axis 22, and the second hinge member has portion 38, which forms gripping structures that surround portion 36 and create friction between portion 36 and 38. During operation, hinge 16 may be adjusted by rotating members 16M relative to each other about hinge axis 22. Members 16M may, if desired, be formed from fiber composite material 30. To enhance the strength of hinge 16, at least some of fibers 32 may be oriented to run perpendicular to axis 22. Fibers 32 may, as shown in FIG. 4, run parallel to the exterior surfaces of members 16M.

Figure 5:
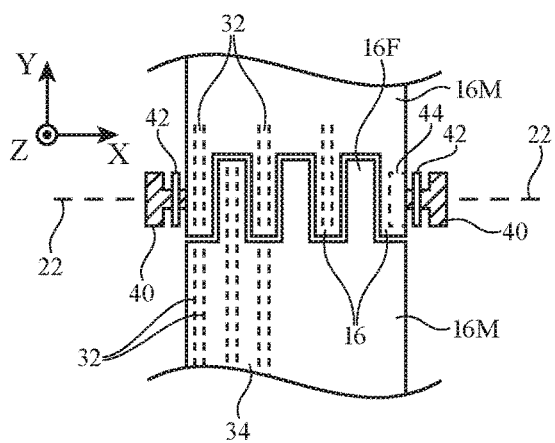
FIG. 5 is a top view of an illustrative friction hinge with interdigitated fingers in accordance with an embodiment.

Another illustrative friction hinge arrangement for hinge 16 is shown in FIG. 5. As shown in FIG. 5, hinge 16 may have first and second members 16M that rotate relative to each other about hinge axis 22. Each hinge member may have a plurality of fingers 16F. Fingers 16F may have any suitable shapes. For example, fingers 16F may be formed from interdigitated slices of material 30. Fibers 32 may run parallel to the longitudinal axes of fingers 16F and perpendicular to hinge axis 22 to help enhance hinge strength.

Friction may be created by squeezing together opposing surfaces of the fingers 16F on a first of members 16M and the fingers 16F on a second of members 16M. To adjust hinge friction, hinge 16 may have structures that apply pressure along the length of hinge 16 (e.g., along hinge axis 22). In the illustrative configuration of FIG. 5, a fastener 40 is used to press inwardly on hinge fingers 16F (e.g., by applying pressure in direction X on the left side of FIG. 5 and by applying opposing pressure in direction −X on the right side of FIG. 5, thereby squeezing fingers 16F together). Fastener 40 may be a screw, bolt, or other fastener structure with a shaft that passes through openings in fingers 16F. One end of fastener 40 may be terminated by a screw or bolt head that is coupled to the shaft. A nut or other threaded fastener component may be attached to the opposing end of fastener 40. In general, any suitable type of fasteners may be use to squeeze together the interdigitated fingers of the friction hinge. The use of screws, bolts, and other threaded members is illustrative.

Figure 6:
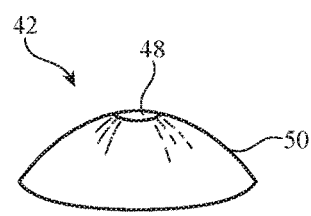
FIG. 6 is a perspective view of an illustrative hinge washer in accordance with an embodiment.

As shown in FIG. 5, optional washers such as washers 42 may be placed on the shaft of the bolt or other fastener 40 that extends along hinge axis 22 through openings in fingers 16F. Washers 42 can be placed at the ends of the hinge and/or at one or more intermediate locations (e.g., between fingers 16F). If desired, recesses such as illustrative recess 44 may be formed in the ends of hinge 16 (e.g., to receive the heads of bolts or other fasteners so that fasteners 40 may lie flush with the surfaces of hinge 16). FIG. 6 is a perspective view of an illustrative washer for use in hinge 16. As shown in FIG. 6, washer 42 may be a conical spring washer (sometimes referred to as a Belleville washer) and may have an opening such as opening 48 in a conical disk such as disk 50.

Figure 7:
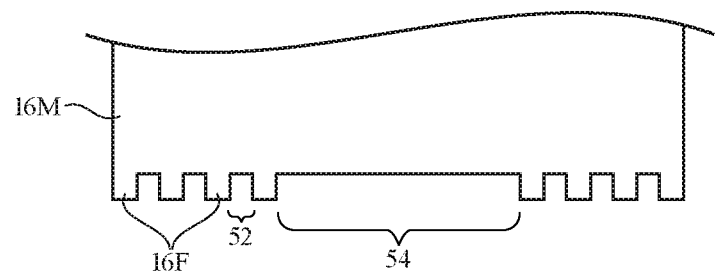
FIG. 7 is a top view of a portion of an illustrative hinge member with fingers in accordance with an embodiment.

Fingers 16F may have any suitable dimensions and may be of the same size or different sizes (e.g., the same width or different widths along axis 22). FIG. 7 shows how one or more areas with enlarged gaps such as gap 54 may be formed along the length of hinge 16. Gaps such as gap 54 may be larger than the gaps such as gap 52 between adjacent fingers 16F on each hinge member 16M (e.g., gap 54 may be at least 10 times, at least 100 times, at least 1000 times, less than 750 times, less than 200 times, less than 30 times, or other suitable times larger than gap 52).

Figure 8:
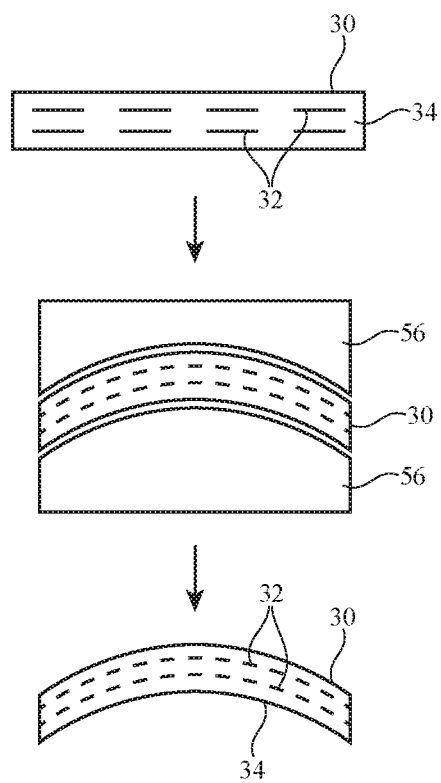
FIG. 8 is a diagram showing how fiber composite material may be formed into a desired shape in accordance with an embodiment.

FIG. 8 shows how fiber composite material 30 for structures such as hinges may be formed under heat and/or pressure. Initially, as shown at the top of FIG. 8, fiber composite material 30 may have fibers 32 and binder 34 with a first shape (e.g. a planar shape, etc.). As shown in the middle of FIG. 8, a die such as die 56 may apply pressure to material 30 to change the shape of material 30 (e.g., to impart a curved surface, to create grooves or other recesses, to create raised features, etc.). Following application of heat and/or pressure using die 56, a part may be created from material 30 that has a desired shape for use in device 10 (e.g., a desired hinge member shape for use in hinge members 16M of hinge 16), as shown in the lower portion of FIG. 8. Configurations in which fingers 16F and/or other structures for hinge 16 are formed by machining and other fabrication processes may also be used, if desired.

Figure 9:
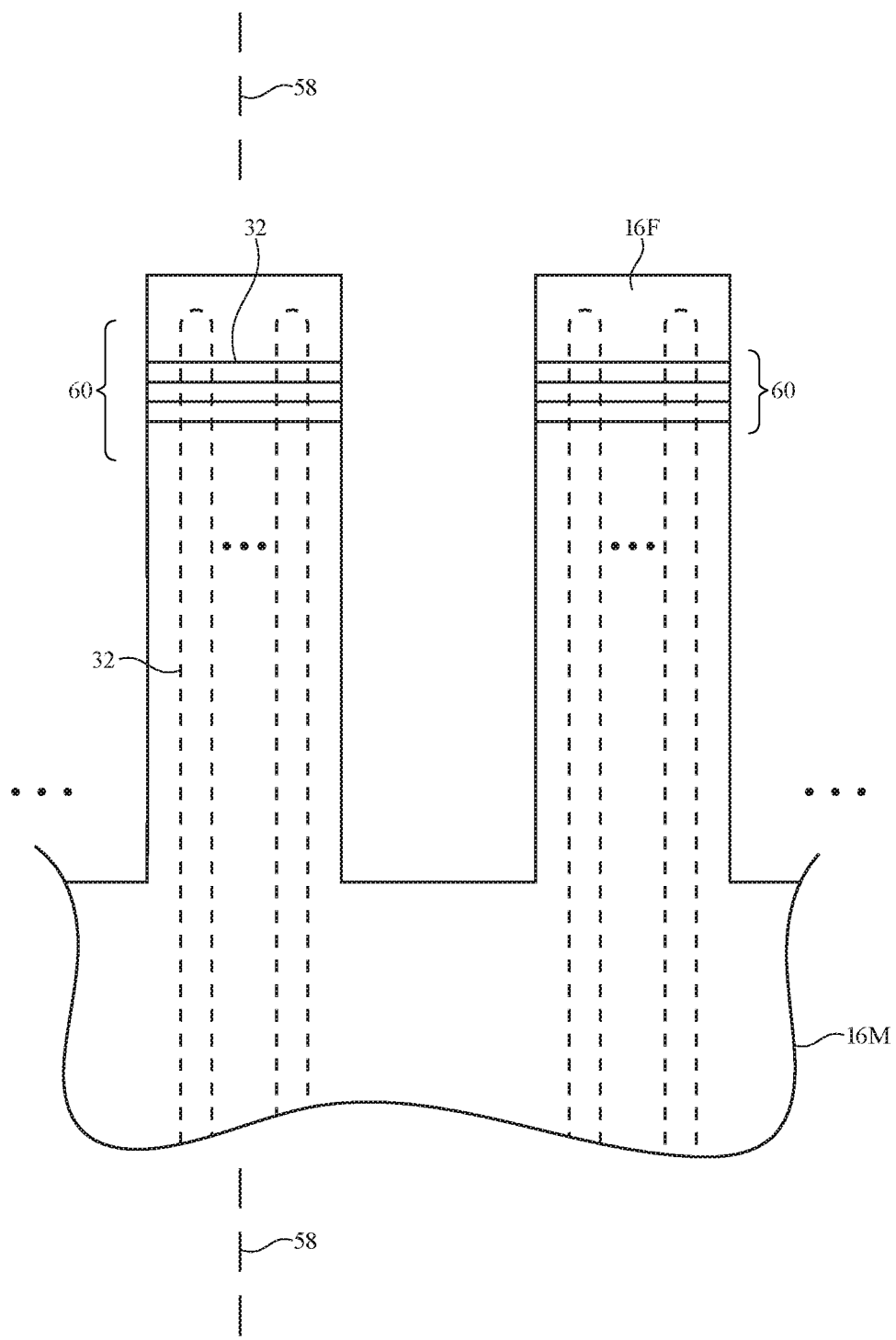
FIG. 9 is a top view of an illustrative electronic device hinge structure showing how fibers may be oriented relative to hinge fingers in accordance with an embodiment.

FIG. 9 is a top view of an illustrative hinge member for a friction hinge. As shown in FIG. 9, hinge member 16M may have a series of elongated fingers 16F that become interdigitated with corresponding fingers 16F on another hinge member 16M when hinge 16 is assembled. As shown in FIG. 9, fibers 32 may include fibers that run parallel to the longitudinal axes of fingers 16F (e.g., parallel to longitudinal axis 58 in the example of FIG. 9) and may include portions that loop back on themselves. This type of arrangement may help increase the strength of hinge 16. If desired, some of fibers 32 may be wrapped around the exposed tips of fingers 16F (e.g., in wrapping regions 60). This helps hold fibers 32 in place and can strengthen hinge 16.

Figure 10:
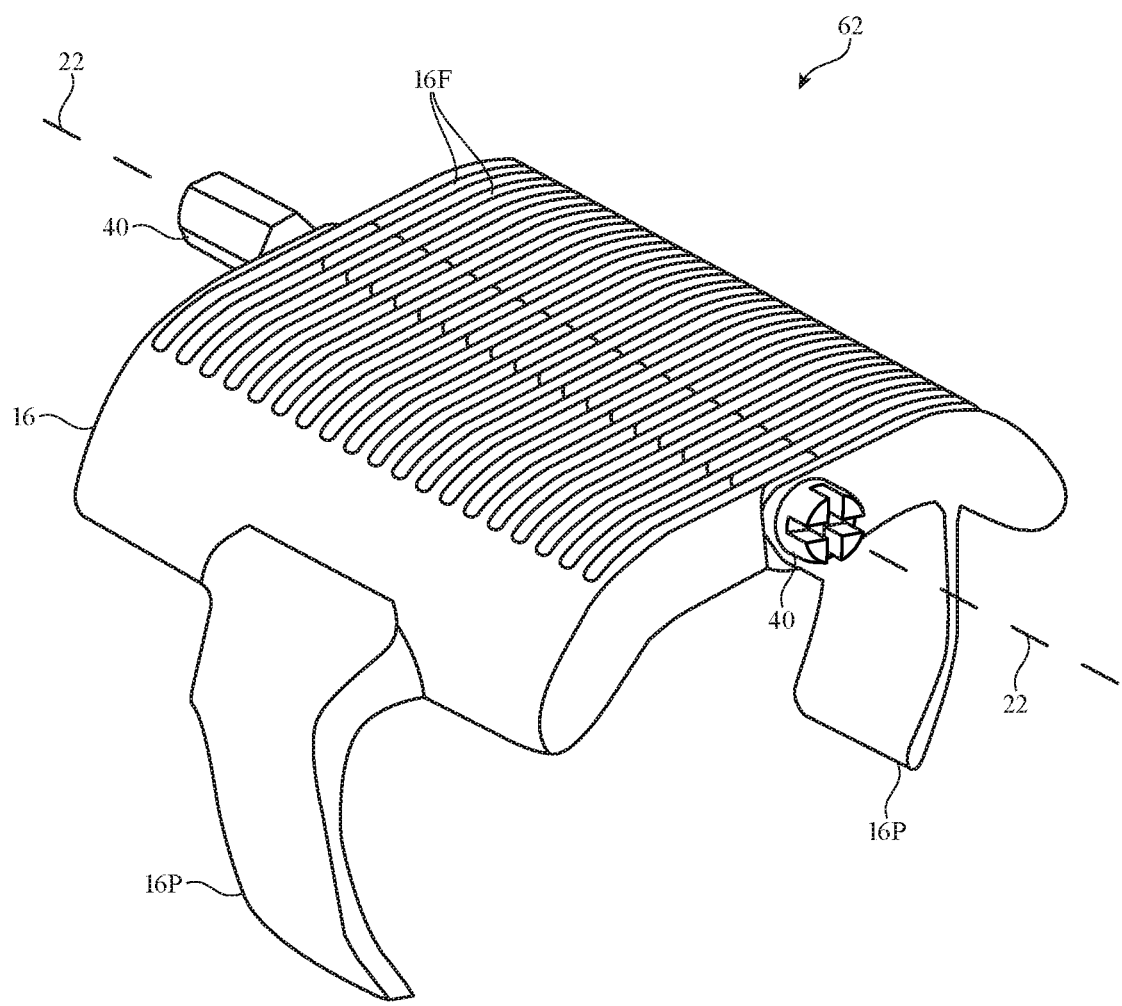
FIG. 10 is a perspective view of an illustrative finger device with a fiber composite friction hinge in accordance with an embodiment.

A perspective view of an illustrative hinge for use in a finger device such as device 10 of FIG. 1 is shown in FIG. 10. Hinge 16 of FIG. 10 may form all or part of housing 12 and/or may be mounted within housing walls formed from fabric, polymer, metal, fiber composite material, and/or other materials (e.g., hinge 16 may be covered with a cosmetic covering layer such as a flexible fabric or polymer layer or other flexible layer). Portions 16P of hinge 16 may help grip the sides of a user's finger when device 10 is mounted on the user's finger. Hinge 16 can allow portions 16P to rotate towards or away from each other about hinge axis 22. Fasteners 40 may be used to adjust the inward pressure on interdigitated fingers 16F along hinge axis 22, thereby adjusting finger-to-finger friction and the overall friction (and therefor resistance to rotation about axis 22) that is exhibited by hinge 16.

Figure 11:
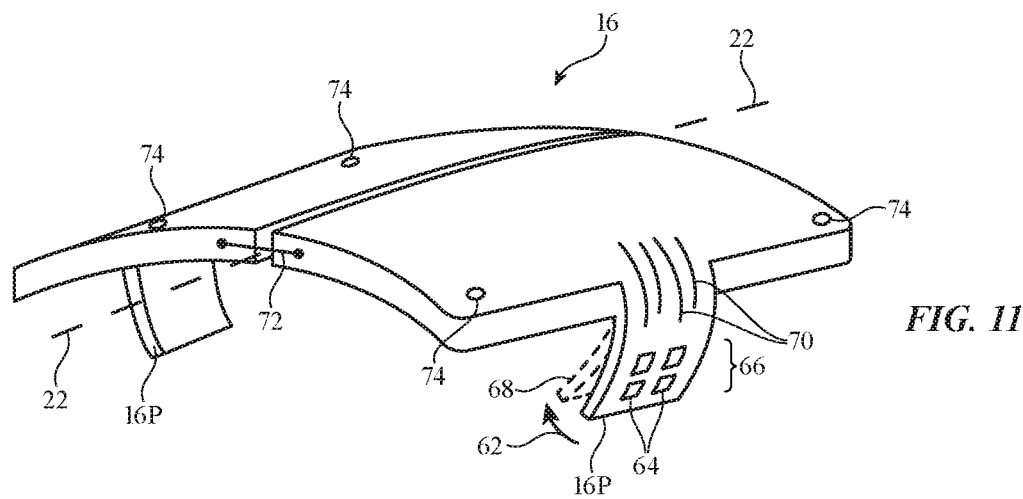
FIG. 11 is a perspective view of an illustrative finger device with adjustable housing structures in accordance with an embodiment.

FIG. 11 is a perspective view of another illustrative hinge for a finger device such as device 10 of FIG. 1. In the illustrative configuration of FIG. 11, hinge 16 has portions that may be adjusted. For example, the position of hinge portion 16P (which may form a part of the housing for device 10) relative to other portions of hinge 16 may be adjusted (e.g., by moving portion 16P in direction 62 to a position such as position 68). The structures of hinge 16 may be adjusted using any suitable actuation mechanism (e.g., a piezoelectric actuator, an electromagnetic actuator, a shape memory actuator, an electrostatic actuator, actuator structures that adjust hinge 16 by generating force through generation of heat, and/or other actuator structures). These actuator structures may be coupled between portions of hinge 16 (see, e.g., shape memory wire actuator 72, which spans hinge axis 22 and adjusts the opening and closing of hinge 16 in the example of FIG. 11) and/or may be embedded in portion 16P or other portions of hinge 16 (e.g., to create bending motion in portions 16P, to create haptic output, etc.). If desired, sensors may be mounted on one or more portions of hinge 16 (see, e.g., illustrative sensors 64 on bendable portion 16P of FIG. 11). Sensors 64 may include, for example, one or more strain gauge sensors or other force sensors. If desired, strain gauge sensors, actuator mechanisms, signal paths, and other structures may be formed form strands of material in hinge 16 (e.g., carbon fiber, other strands 32, etc.). In some configurations (e.g., when device 10 is used in a system having a head-mounted device or other device with camera-based tracking component or other tracking component, tracking elements 74 may be formed at one or more locations on the surface of hinge 16 (e.g., at visible locations on the exterior of device 10). Tracking elements 74 may include light sources such as light-emitting diodes or lasers that emit light and/or may include visible registration marks. During operation of device 10 in the vicinity of a head-mounted device, computer, or other equipment with an optical sensor such as a camera, tracking elements 74 may be viewed using the camera to help determine the position and orientation of device 10.

Figure 12:
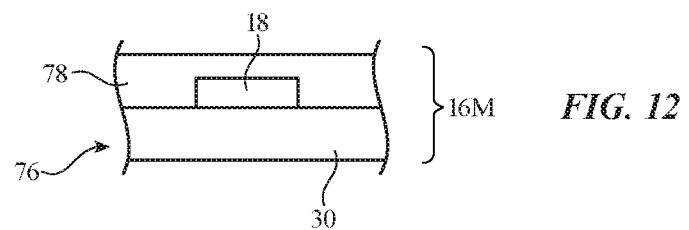
FIG. 12 is a cross-sectional side view of a portion of an illustrative electronic device in accordance with an embodiment.

FIG. 12 is a cross-sectional side view of a portion of an illustrative hinge member showing how the hinge member may include portions that encapsulate components. As shown in FIG. 12, hinge member 16M may have portion 76 (e.g., e.g., a hinge structure formed from fiber composite material 30) onto which component 18 has been mounted. Encapsulating material 78 (e.g., fiber composite material, polymer, other material, etc.) may be formed over component 18 on portion 76 to encapsulate and thereby protect component 18 from moisture and other environmental contaminants.

Figure 13:
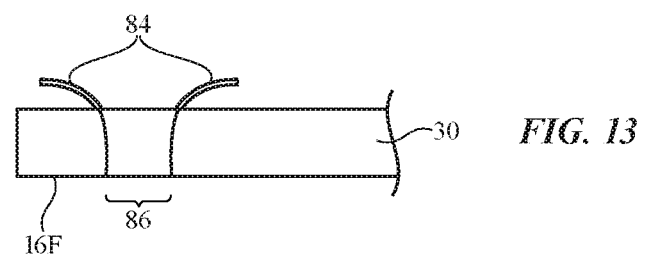
FIG. 13 is a cross-sectional side view of a fiber composite structure with an integrated washer formed from structures running around the periphery of a hole in the fiber composite structure in accordance with an embodiment.
Figure 14:
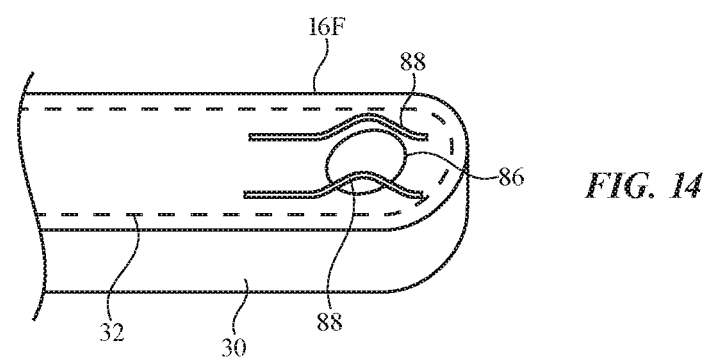
FIG. 14 is a perspective view of a fiber composite structure with an integrated washer formed from a pair of springs formed on opposing sides of a hole in the fiber composite structure in accordance with an embodiment.

If desired, portions of material 30 may extend outwardly to form washers. Consider, as an example, the cross-sectional side view of illustrative hinge finger 16F of FIG. 13. As shown in FIG. 13, hinge finger 16F may be formed from fiber composite material 30. Finger member 16F may have an opening such as through-hole 86 to accommodate the shaft of fastener 40. A spring washer structure may be created as an integral portion of material 30. For example, spring washer 84 may be formed from portions of material 30 (e.g., fibers 32 and binder 34) that form a conical structure or set of spring fingers surrounding hole 86. In the example of FIG. 14, springs 88 have been formed from bowed-out portions of material 30 on opposing sides of hole 86. Fibers 32 may run parallel to the longitudinal axis of finger 16F and may, if desired, double back on themselves after wrapping around opening 86. This arrangement for fibers 32 may help strengthen finger member 16F in the vicinity of hole 86.

Figure 15:
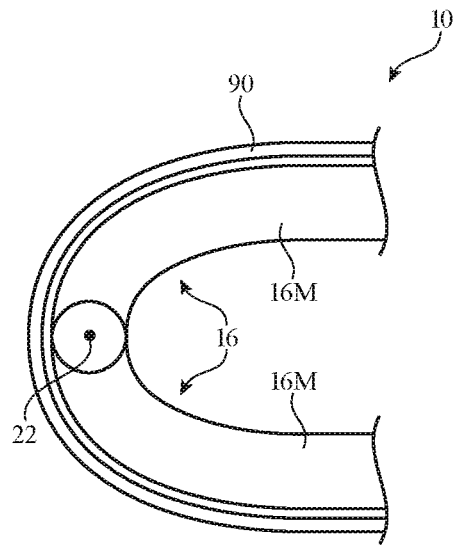
FIGS. 15, 16, and 17 are cross-sectional side views of illustrative electronic devices with friction hinges in accordance with embodiments.
Figure 16:
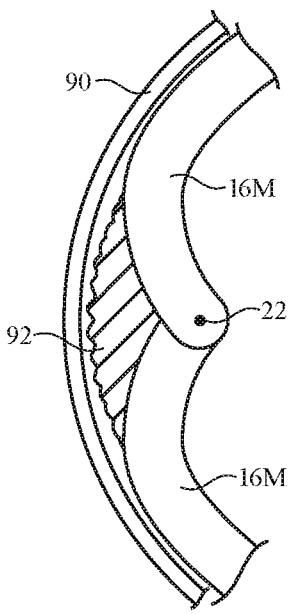

In some configurations for device 10, one or more flexible structures may overlap hinge axis 22. Consider, as an example, the cross-sectional side view of a portion of device 10 that is shown in FIG. 15. As shown in FIG. 15, hinge 16 may have hinge members 16M that form a friction hinge. The hinge members may have sets of interdigitated hinge fingers that are squeezed together along hinge axis 22 and may be configured to allow rotation about hinge axis 22. One or more layers such as layer 90 may overlap hinge axis 22 and hinge 16. Layers such as layer 90 may be formed on the inner and/or outer surfaces of hinge members 16M. Layer(s) 90 may include flexible housing structures, flexible displays, flexible touch sensors, flexible strips of pixels covered with touch sensors (e.g., for a dynamic function row or other input-output device), and/or other flexible layers. As shown in FIG. 16, flexible material 92 (e.g., silicone or other elastomer) may be formed between layer 90 and hinge 16 to help smooth out layer 90 in arrangements in which hinge 16 creates a wavy support surface for layer 90.

Figure 17:
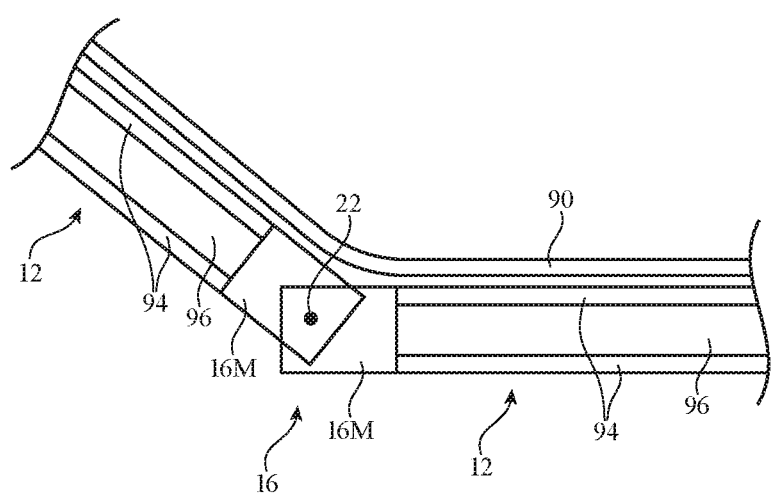

FIG. 17 is a cross-sectional side view of a portion of device 10 in an illustrative configuration in which housing 12 includes a core covered by one or more cladding sheets. As shown in FIG. 17, housing 12 may have portions that are joined by hinge 16. Hinge 16 may have friction hinge members 16M that are configured to rotate about hinge axis 22. Hinge members 16M may be coupled to respective portions of separate structures forming housing 12. Each housing portion may include a core such as core 96 covered with covering layers such as cladding layers 94. In an illustrative configuration, core 96 is a layer of foam or other lightweight material and cladding layers 94 are formed from stainless steel or other metal. Arrangements in which core 96 and/or cladding layers 94 are formed from other materials (e.g., fiber composite material, polymer, fabric, metal, other materials, and/or combinations of these materials) may also be used. The use of a multilayer configuration for housing 12 may help provide housing 12 with strength while minimizing weight. One or more layers such as layer 90 may overlap hinge 16 and hinge axis 22 and/or may overlap housing 12.

Figure 18:
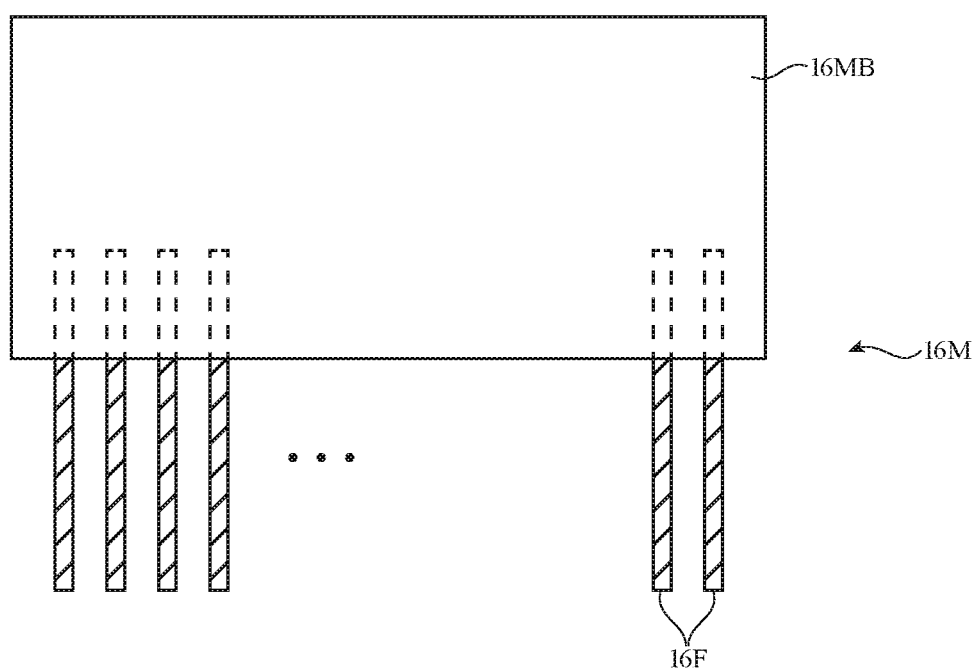
FIG. 18 is a top view of an illustrative friction hinge structure in which fiber composite hinge members are supported by a polymer support structure that is separate from the fiber composite hinge members and that may not contain fibers in accordance with an embodiment.

If desired, hinge fingers 16F may be supported in a support member that is formed separately from fingers 16F. Consider, as an example, hinge member 16M of FIG. 18. As shown in FIG. 18, hinge member 16M may have a set of parallel elongated hinge members such as hinge fingers 16F. Hinge fingers 16F may be formed from carbon fiber, other fiber composite materials, metal (e.g., metal leaves formed from thin protruding sheets of metal that interdigitate with corresponding thin protruding sheets of metal in a mating hinge as described in connection with interdigitated fingers 16F of FIG. 10), and/or other materials and may extend parallel to each other. Hinge fingers 16F may have aligned holes that receive a shaft of fastener 40. To support hinge fingers 16F in a desired configuration, one end of each hinge finger may be embedded in a support member such as support structure 16MB. Support structure 16MB may be formed from carbon fiber or other fiber composite material, may be formed from polymer that does not contain fibers, and/or may be formed from other material. Fingers 16F may be held in position by a jig while polymer or other material of support structure 16MB is molded on top of portions of hinge fingers 16F (e.g., while carbon fiber material or other fiber composite material is overmolded on top of the metal leaves) and/or hinge fingers 16F may be inserted into holes that have been formed in support structure 16MB (as examples).

Figure 19:
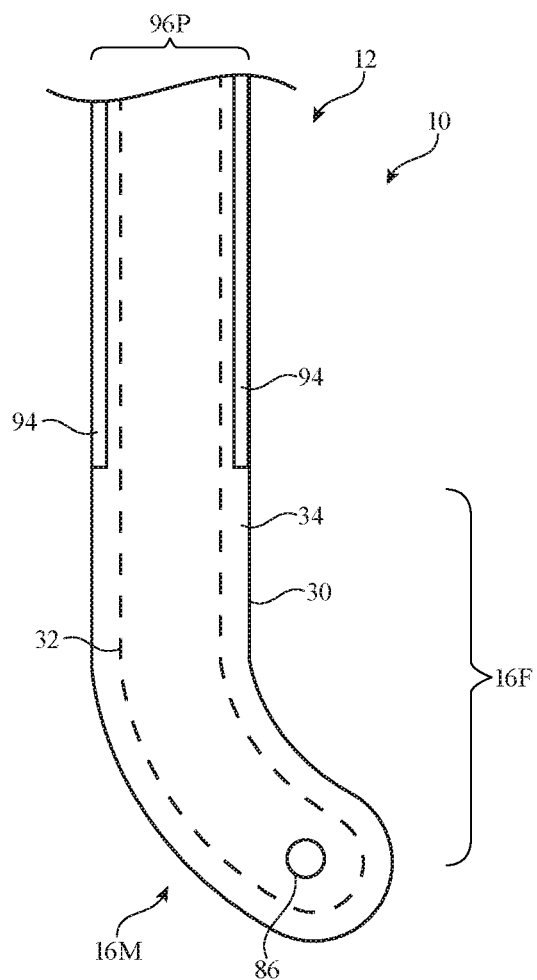
FIG. 19 is a cross-sectional side view of an illustrative hinge member that has a portion that is integral with a portion of a housing for an electronic device in accordance with an embodiment.

FIG. 19 is a cross-sectional side view of an illustrative hinge member and integral housing structures with cladding. The structures of FIG. 19 may be formed from fiber composite material 30. In particular, a continuous piece of material 30 may form a core part of housing 12 (see, e.g., portion 96P) and may form hinge member 16M. Optional cladding layers 94 (e.g., layers of metal or other material) may be formed on the outer surfaces of portion 96P (e.g., to enhance strength, improve the appearance of housing 12, etc.).

Figure 20:
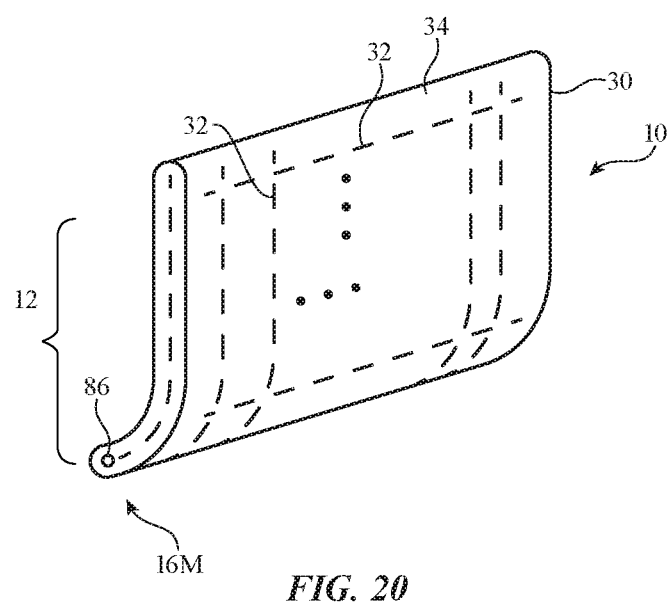
FIG. 20 is a perspective view of an illustrative housing structure such as a lid or base member in a laptop computer or other folding electronic device in accordance with an embodiment.

The exposed ends of material 30 may have openings such as opening 86 and may form elongated hinge fingers. Fibers 32 may be embedded in binder 34 to form material 30. As shown in FIG. 19, fibers 32 may run parallel to the longitudinal axis of fingers 16F and, if desired, may loop back on themselves after wrapping about hole 86. A perspective view of a portion of device 10 that includes hinge structures of the type shown in FIG. 19 is shown in FIG. 20. As shown in FIG. 20, material 30 may form a housing (e.g., a lid or base housing for a laptop computer or other foldable device, etc.).

Figure 21:
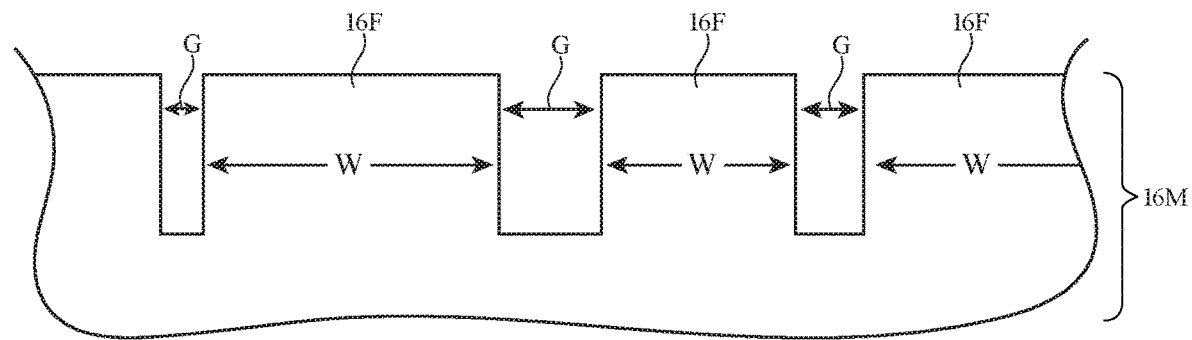
FIG. 21 is a top view of an illustrative electronic device hinge structure in accordance with an embodiment.

FIG. 21 illustrates how the widths W of fingers 16F may be larger than the sizes of gaps G between fingers 16F. Widths W may all be the same and/or may be different from each other. Similarly, gaps G may all have a common value (e.g., some or all gaps G may be equal to each other) or gaps G may vary in size. Widths W and gaps G may have any suitable sizes (e.g., at least 0.05 mm, at least 0.1 mm, at least 0.3 mm, at least 1 mm, less than 5 mm, less than 1.5 mm, less than 1 mm, less than 0.7 mm, less than 0.5 mm, less than 0.2 mm, less than 0.06 mm, or other suitable size). The ratio of the length of fingers 16F to width W may be at least 2, at least 5, at least 10, at least 30, at least 100, less than 35, or other suitable amount. The ratio of the thickness of fingers 16F to width W may be at least 2, at least 5, at least 10, at least 30, less than 100, less than 35, or other suitable amount.

Figure 22:
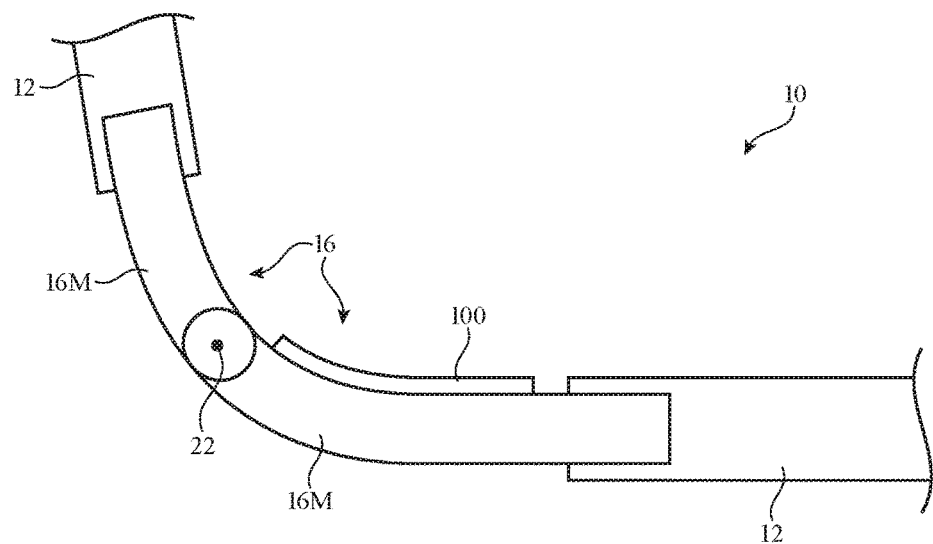
FIG. 22 is a cross-sectional side view of an illustrative electronic device with a hinge structure in accordance with an embodiment.

FIG. 22 is a cross-sectional side view of hinge 16 in an illustrative configuration in which hinge members 16M are joined to separate housing structures (e.g., first and second movable portions of housing 12). Housing 12 may be formed from overmolded plastic and/or other materials that are joined to hinge members 16M. Hinge members 16M may have interdigitated fingers 16F forming a friction hinge that rotates about axis 22. If desired, layer 100 may be formed on hinge 16. Layer 100 may be a strip-shaped flexible touch screen display or other flexible layer. For example, layer 100 may be an organic light-emitting diode display with a two-dimensional capacitive touch sensor that forms a dynamic function row and may be attached to an exposed surface of one of hinge members 16M.

If desired, device 10 may include metal members or other structures that are joined with fiber composite material. As an example, consider member 102 of FIG. 23. Member 102 of FIG. 23 may be formed from metal, ceramic, glass, polymer, fiber composite material, natural materials such as wood, fabric, and/or other suitable materials. In an illustrative configuration, member 102 may be formed from metal. Member 102 may form a portion of a hinge (e.g., member 102 may be a positive hinge member for hinge 16 or a corresponding negative hinge member for hinge 16 and may include, for example, a series of metal leaves or other structures forming fingers 16F that interleave with corresponding fingers 16F on a mating hinge member) or other suitable structure for device 10. Device 10 may have structures (e.g., housing structures 12 and/or other structures) that are coupled to member 102. These structures may be formed from metal, ceramic, glass, polymer, fiber composite material, natural materials such as wood, fabric, and/or other suitable materials.

Figure 23:
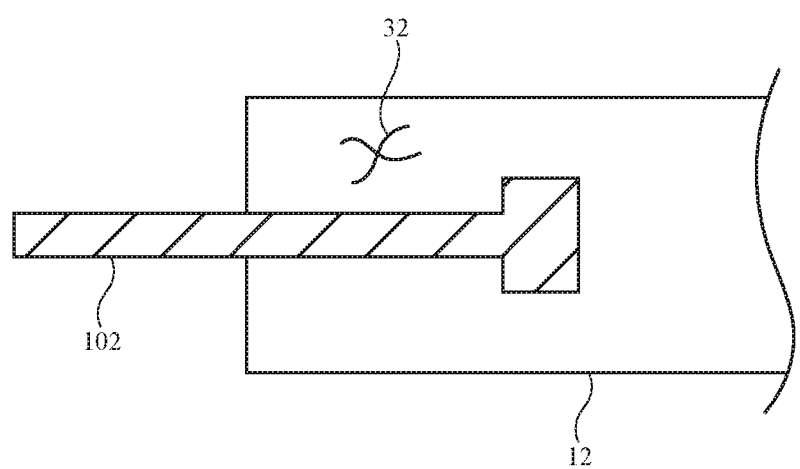
FIG. 23 is a cross-sectional side view of a portion of an electronic device having a metal member or other part that is joined with a housing material such as a fiber composite housing structure in accordance with an embodiment.

In the example of FIG. 23, housing 12 is formed from fiber composite material (e.g., carbon fiber material or other fiber composite material) that has fibers 32 (e.g., fibers 32 such as carbon fibers or glass fibers in a polymer binder). A fiber composite housing structure may, as an example, be formed in a mold. Metal members such as metal member 102 (e.g., fingers 16F, etc.) may be placed in the mold. Fiber composite material may then be molded over metal member 102, thereby securing the fiber composite material to member 102.

In this way, a unibody housing structure (e.g., housing 12 of FIG. 23) may be joined to metal hinge structures. Housing 12 of FIG. 23 may, for example, form the upper housing (or lower housing) of a laptop computer while member 102 forms a negative (or positive) hinge structure with fingers 16F. After molding a fiber composite upper housing to a first metal hinge member and molding a fiber composite lower housing to a second hinge member, the first and second hinge members may be joined to form a hinge (hinge 16) that allows the upper and lower housing portions to rotate relative to each other.

Figure 24:
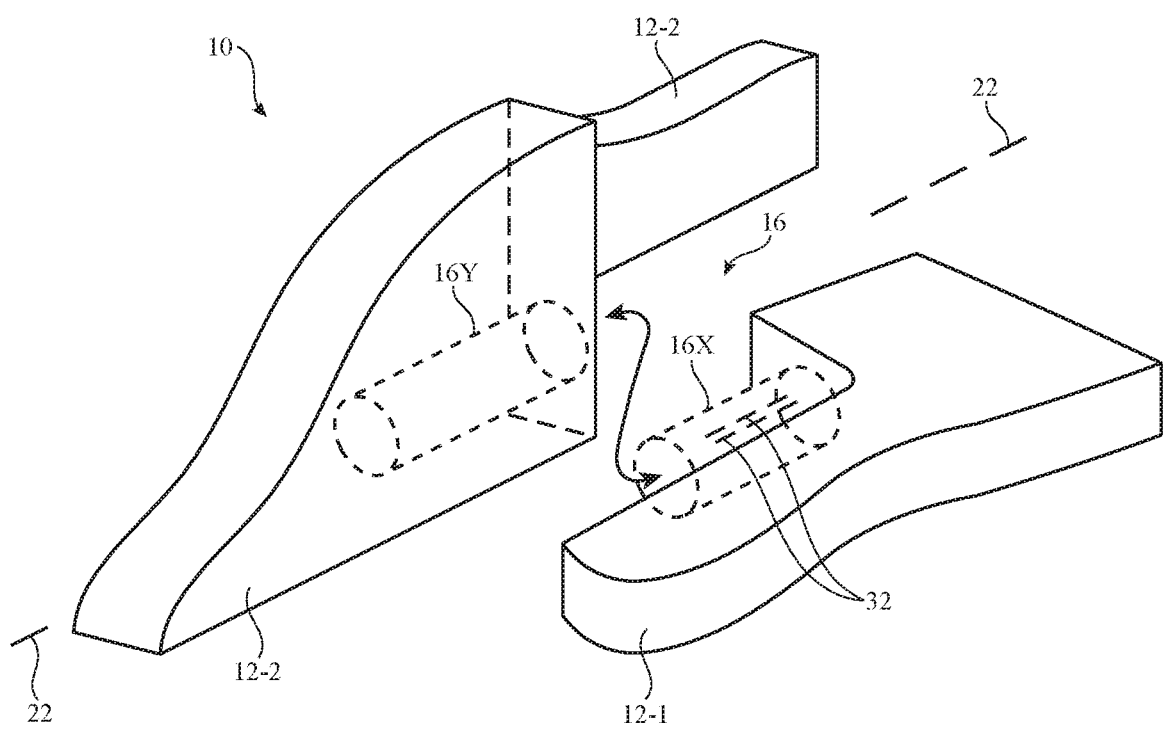
FIG. 24 is an exploded perspective view of a portion of an electronic device with a hinge structure in accordance with an embodiment.

In addition to or instead of using separate members that are joined to fiber composite housing material using molding techniques or other attachment mechanisms, device 10 may, if desired, include housing structures with integral hinge structures. Consider, as an example, the portion of device 10 that is shown in FIG. 24. In the illustrative configuration of FIG. 24, device 10 has housing portions 12-1 and 12-2 (e.g., lower and upper housing portions in a laptop computer). As illustrated in the exploded perspective view of FIG. 24, protruding hinge shaft 16X may have fibers 32 that run into housing portion 12-1. Shaft 16X and the remainder of housing portion 12-1 may be formed as an integral fiber composite structure having fibers 32 embedded in polymer binder. Cylindrical recess 16Y may be formed in housing portion 12-2, which may also be formed from fiber composite material. During assembly operations, shaft 16X may be pressed into recess 16Y to form hinge 16. During operation, housing portion 12-2 may rotate relative to housing portion 12-1 about hinge axis 22 of the hinge (hinge 16) formed from the structures forming recess 16Y and shaft 16X. If desired, shaft 16X may be formed from a metal member that is overmolded with fiber composite material (see, e.g., member 102 of FIG. 23), may be formed from a sleeve of metal or polymer that covers an inner shaft of fiber composite material, etc.

Figure 25:
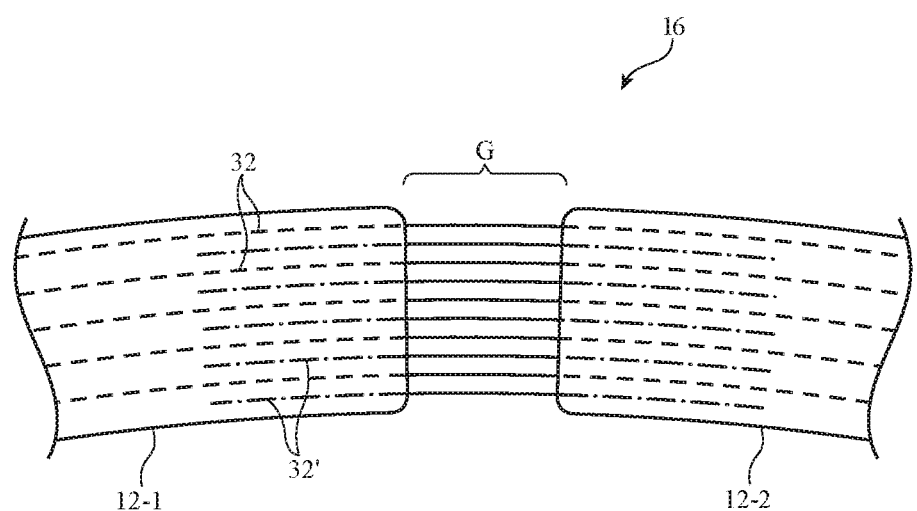
FIG. 25 is a cross-sectional side view of an illustrative hinge structure formed from strands of material in accordance with an embodiment.

In the illustrative arrangement of FIG. 25, hinge 16 has been formed from flexible fibers in gap G between first housing portion 12-1 and second housing portion 12-2 (or other movable structures in device 10). The fibers forming hinge 16 of FIG. 25 may extend throughout portions 12-1 and 12-2 (e.g., hinge 16 may be formed from fibers 32 that also are used in forming the fiber composite material of portions 12-1 and 12-2). With this type of arrangement, continuous carbon fiber strands or other fibers 32 can be arranged throughout device 10 and selected portions may be overmolded with polymer to form housing structures or other structural portions of device 10.

If desired, different fibers may be used in hinge 16 than are used in forming the fiber composite material of portions 12-1 and 12-2. For example, fibers 32' may have first ends that are embedded in portion 12-1 (but that do not extend continuously throughout portion 12-1) and may have second ends that are embedded in portion 12-2 (but that do not extend continuously throughout portion 12-2). The inclusion of fibers 32' may help provide hinge 16 with desired properties (durability, stiffness, etc.). If desired, other flexible structures (e.g., strips of material rather than fibers, etc.) may be used in forming flexible hinge structures in gap G. These strips of material and/or fibers in gap G may include shape memory metals, piezoelectric materials, and/or other materials that can be electrically adjusted to change flexibility and other properties. Fibers 32 and other flexible structures for hinge 16 may be carbon fibers, glass fibers, polymer fibers, and/or fibers or other structures formed from other materials. If desired, metal fibers (e.g., solid core wires, multifilament wires, bare and/or insulated wires, etc.) may be used for forming some or all of fibers 32 and/or 32'.

As shown in FIG. 25, fibers 32' and 32 may be separate from each other. As an example, fibers 32 may be formed from carbon fiber, whereas fibers 32' may be formed from polymer. In other illustrative configurations, fibers 32 may be omitted (e.g., so that fibers 32' form hinge 16) or fibers 32' may be omitted (so that fibers 32 form hinge 16 while extending throughout portions 12-1 and 12-2).

Fibers 32 and 32' of FIG. 25 and the other FIGS. may be carbon fibers, polymer fibers, glass fibers, fibers formed from other materials, and/or fibers formed from combinations of one or more of these materials. If desired, fiber composite material, which is sometimes described as forming housing 12 and/or other structures in device 10 may be supplemented by or replaced by other materials (e.g., polymer, glass, ceramic, metal, wood and other natural materials, fabric, other materials, and/or combinations of these material). These materials may be attached to carbon fibers or other fibers 32 using adhesive, by overmolding the materials over fibers, using fasteners such as screws, using techniques such as welding, crimping, intertwining techniques such as weaving, knitting, and braiding, and/or using other attachment techniques. As an example, bare and/or insulated metal wire, polymer fibers formed from silicone or other elastomeric material, and/or other fibers can be selectively overmolded with polymer or other material (e.g., injection-molded polymer) to form housing portions 12-1 and 12-2 and/or other structures in device 10, while leaving other portions such as the fibers in gap G of FIG. 25 uncovered by overmolded material so that these uncovered portions may form hinge 16. Illustrative arrangements in which housing 12 is formed from fiber composite material are presented as an example. In general, housing 12 and the structures forming hinge 16 may be formed using any suitable materials.

As described above, one aspect of the present technology is the gathering and use of information such as information from input-output devices. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

The foregoing is merely illustrative and various modifications can be made to the described embodiments. The foregoing embodiments may be implemented individually or in any combination.

What is claimed is:

1. An electronic device, comprising:
   a fiber composite friction hinge having first and second hinge members with interdigitated structures configured to allow the first and second hinge members to rotate relative to each other about a hinge axis;
   a housing having first and second housing portions that are coupled respectively to the first and second hinge members and that rotate relative to each other about the hinge axis; and
   electrical components coupled to the housing.

2. The electronic device defined in claim 1 wherein the interdigitated structures comprise interdigitated first and second sets of elongated fingers, wherein the first set of elongated fingers forms part of the first hinge member, and wherein the second set of elongated fingers forms part of the second hinge member.

3. The electronic device defined in claim 2 wherein the interdigitated first and second sets of elongated fingers have holes and wherein the fiber composite friction hinge comprises a fastener that passes through the holes and applies pressure to squeeze the interdigitated first and second sets of elongated fingers against each other.

4. The electronic device defined in claim 3 wherein the first and second hinge members are formed from fiber composite material and wherein a portion of the fiber composite material forms a spring.

5. The electronic device defined in claim 4 wherein the spring is adjacent to one of the holes and is formed from fibers in the fiber composite material.

6. The electronic device defined in claim 3 wherein the first and second sets of elongated fingers are formed from fiber composite material having fibers embedded in binder.

7. The electronic device defined in claim 6 wherein the fibers in the first and second sets of elongated fingers have fibers that wrap around the holes.

8. The electronic device defined in claim 2 wherein the first and second hinge members respectively have first and second support structures without fibers and wherein the first and second sets of elongated fingers are formed from fiber composite material and have ends that are embedded respectively in the first and second support structures.

9. The electronic device defined in claim 2 wherein the first and second hinge members respectively have first and second support structures formed from fiber composite material, wherein the first and second sets of elongated fingers are formed from the fiber composite material, and wherein fibers in the fiber composite material of the first and second elongated fingers extend into the first and second support structures, respectively.

10. The electronic device defined in claim 1 further comprising an actuator configured to adjust a position of a first portion of the first hinge member relative to a second portion of the first hinge member.

11. The electronic device defined in claim 1 further comprising a flexible display that overlaps the hinge axis.

12. The electronic device defined in claim 1 further comprising a display, wherein the first housing portion is configured to support the display and wherein the first housing portion includes fibers that extend into the first housing portion from the first hinge member.

13. The electronic device defined in claim 1 wherein the fiber composite friction hinge is formed from carbon fiber composite material.

14. The electronic device defined in claim 13 wherein:
the interdigitated structures comprise fingers with holes;
the friction hinge comprises a fastener that passes through the holes and squeezes the fingers together;
the carbon fiber composite material incudes fibers embedded in binder; and
the fibers wrap around the holes and double back on themselves.

15. The electronic device defined in claim 14 wherein the fastener has a shaft that extends through the holes and has a head received within a recessed portion of the fiber composite friction hinge.

16. An electronic device, comprising:
first and second carbon fiber hinge members, wherein the first carbon fiber hinge member has first fingers, wherein the second carbon fiber hinge member has second fingers that are interdigitated with the first fingers;
a fastener that has a shaft that passes through the first and second fingers to allow the first and second fiber composite hinge members to rotate relative to each other about a hinge axis, wherein the fastener squeezes the first and second fingers together to create friction between the first and second carbon fiber hinge members;
a flexible layer that overlaps the hinge axis and that is configured to bend as the first and second fiber composite hinge members rotate relative to each other;
a sensor; and
control circuitry configured to gather sensor information from the sensor.

17. The electronic device defined in claim 16 wherein the flexible layer comprises a light-emitting diode display.

18. An electronic device, comprising:
a first carbon fiber hinge member having a first set of elongated fingers; and
a second carbon fiber hinge member having a second set of elongated fingers that is interdigitated with the first set of elongated fingers, wherein the first and second sets of elongated fingers have holes aligned with a hinge axis;
a fastener having a shaft that passes through the holes and that is configured to squeeze the first and second sets of elongated fingers together along the hinge axis;
an electrical component configured to gather input; and
wireless communications circuitry configured to wirelessly transmit information in response to the input.

19. The electronic device defined in claim 18 further comprising:
a flexible display that overlaps the hinge axis.

20. The electronic device defined in claim 18 wherein portions of the first and second carbon fiber hinge members are configured to grip sides of a finger to hold the first and second carbon fiber hinge members to the finger.

21. An electronic device, comprising:
fibers;
a housing formed from polymer material that is overmolded over a first portion of the fibers to form a first housing portion and that is overmolded over a second portion of the fibers to form a second housing portion, wherein the fibers are uncovered with the polymer material and form a hinge in a gap between the first and second housing portions; and
electrical components coupled to the housing.

22. The electronic device defined in claim 21 wherein the fibers comprise fibers selected from the group consisting of: carbon fibers, glass fibers, polymer fibers, and metal fibers.

23. An electronic device, comprising:
a fiber composite housing formed from fibers in polymer binder;
a hinge having a first metal member that is overmolded by a first portion of the fiber composite housing and having a corresponding second metal member that is overmolded by a second portion of the fiber composite housing; and
electrical components coupled to the housing.

24. The electronic device defined in claim 23 wherein the fibers comprise carbon fibers.

25. The electronic device defined in claim 23 wherein the first metal member comprises first metal hinge fingers and wherein the second metal member comprises second metal hinge fingers that are interleaved with the first metal hinge fingers.

26. The electronic device defined in claim 25 wherein the fibers comprise carbon fibers.

27. The electronic device defined in claim 26 wherein the first and second metal hinge fingers have holes aligned with a hinge axis, the electronic device further comprising a fastener having a shaft that passes through the holes and that is configured to squeeze the first and second metal hinge fingers together along the hinge axis.

28. The electronic device defined in claim 26 further comprising:
   an electrical component configured to gather input; and
   wireless communications circuitry configured to wirelessly transmit information in response to the input.

* * * * *